(12) United States Patent
Niklewski

(10) Patent No.: US 8,020,691 B2
(45) Date of Patent: Sep. 20, 2011

(54) BELT CONVEYOR AND CRUSHING UNIT

(75) Inventor: Andrzej Niklewski, São Paulo (BR)

(73) Assignee: Metso Minerals (Brasil) LTDA, Sorocaba-SP (BR)

( * ) Notice: Subject to any disclaimer, the term of this patent is extended or adjusted under 35 U.S.C. 154(b) by 0 days.

(21) Appl. No.: 10/510,163

(22) PCT Filed: Apr. 1, 2003

(86) PCT No.: PCT/BR03/00054
§ 371 (c)(1),
(2), (4) Date: Oct. 1, 2004

(87) PCT Pub. No.: WO03/082472
PCT Pub. Date: Oct. 9, 2003

(65) Prior Publication Data
US 2005/0121295 A1    Jun. 9, 2005

(30) Foreign Application Priority Data

Apr. 2, 2002  (BR) .................................. 0201210

(51) Int. Cl.
*B65G 31/02* (2006.01)
(52) U.S. Cl. ............ 198/564; 198/638; 198/314; 241/79
(58) Field of Classification Search .................. 198/314, 198/544, 550.9, 550.13, 561, 564, 603, 607, 198/638, 641; 241/78, 80, 81
See application file for complete search history.

(56) References Cited

U.S. PATENT DOCUMENTS

| | | | | | |
|---|---|---|---|---|---|
| 672,358 | A | * | 4/1901 | Dodge | 198/638 |
| 2,117,300 | A | * | 5/1938 | Corser | 241/76 |
| 2,210,093 | A | * | 8/1940 | Morrissey | 198/537 |
| 2,256,731 | A | * | 9/1941 | Winther | 241/76 |
| 2,852,126 | A | * | 9/1958 | Ohlberg | 198/547 |
| 3,332,534 | A | * | 7/1967 | Mills | 198/547 |
| 4,203,512 | A |   | 5/1980 | Ammeraal | 198/594 |
| 4,584,118 | A | * | 4/1986 | Parlman et al. | 252/61 |
| 4,597,491 | A | * | 7/1986 | Conklin | 198/642 |
| 4,598,875 | A |   | 7/1986 | Bronson et al. | 241/78 |
| 5,996,769 | A |   | 12/1999 | Winchip | 198/626.4 |

FOREIGN PATENT DOCUMENTS

| | | |
|---|---|---|
| DE | 1134027 B | 7/1962 |
| JP | 60188216 A | 9/1985 |

OTHER PUBLICATIONS

International Search Report for PCT/BR03/00054, dated Jun. 23, 2003.
International Preliminary Examination Report for PCT/BR03/00054, dated Jun. 8, 2004.

* cited by examiner

*Primary Examiner* — Mark A Deuble
(74) *Attorney, Agent, or Firm* — Abelman, Frayne & Schwab

(57) ABSTRACT

A belt conveyor and a crushing unit includes a conveying upper run presenting a feed end and a discharge end, and a return lower run, with the conveying upper end including a curved extension, which is concave and ascending and presents an inlet lower portion and an outlet upper portion of the conveying upper run, where the belt conveyor imparts to the material a path that is substantially coplanar and opposite in relation to that imparted to the material in the inlet portion, and with ascending curved path presenting at a determined belt speed, a centrifugal force sufficient to maintain the material seated against the curved extension of the conveying upper run until reaching the discharge end.

13 Claims, 7 Drawing Sheets

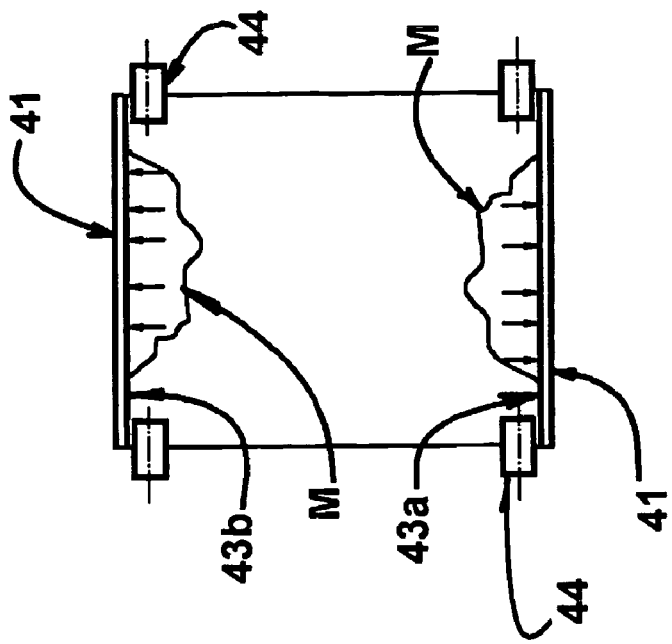
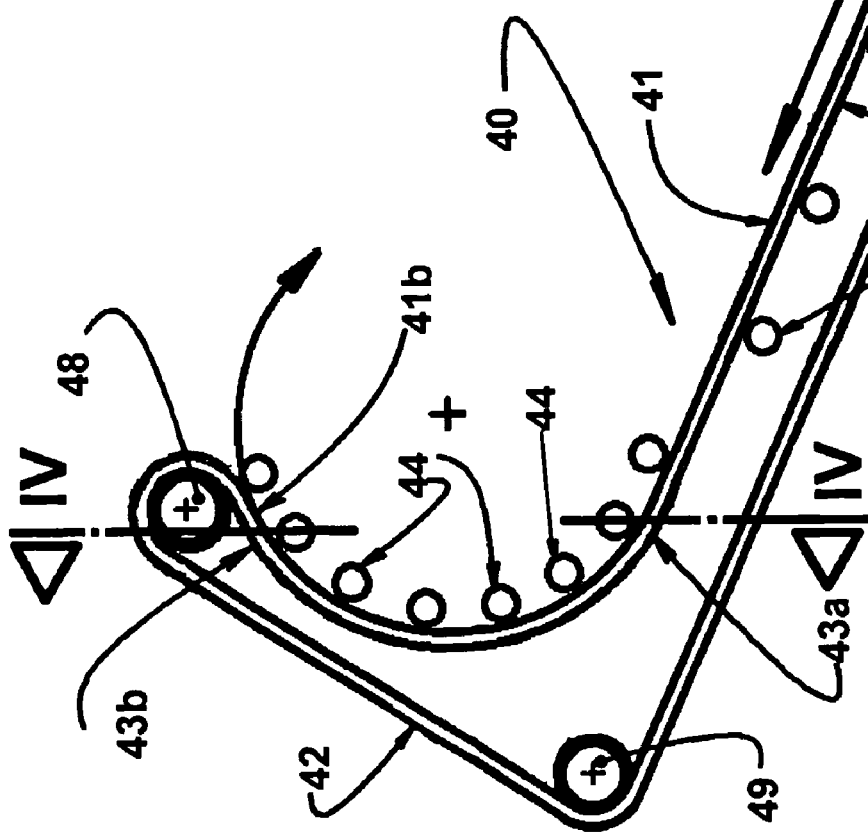

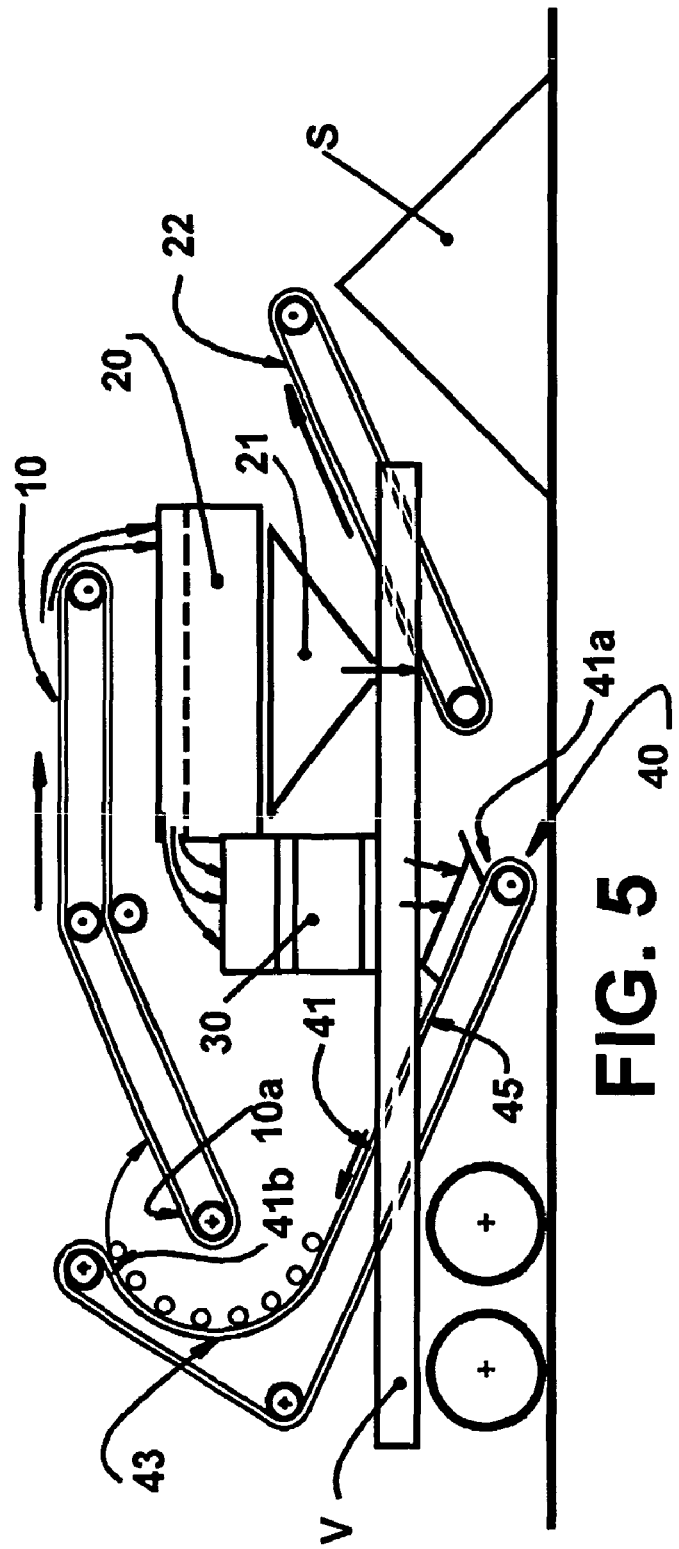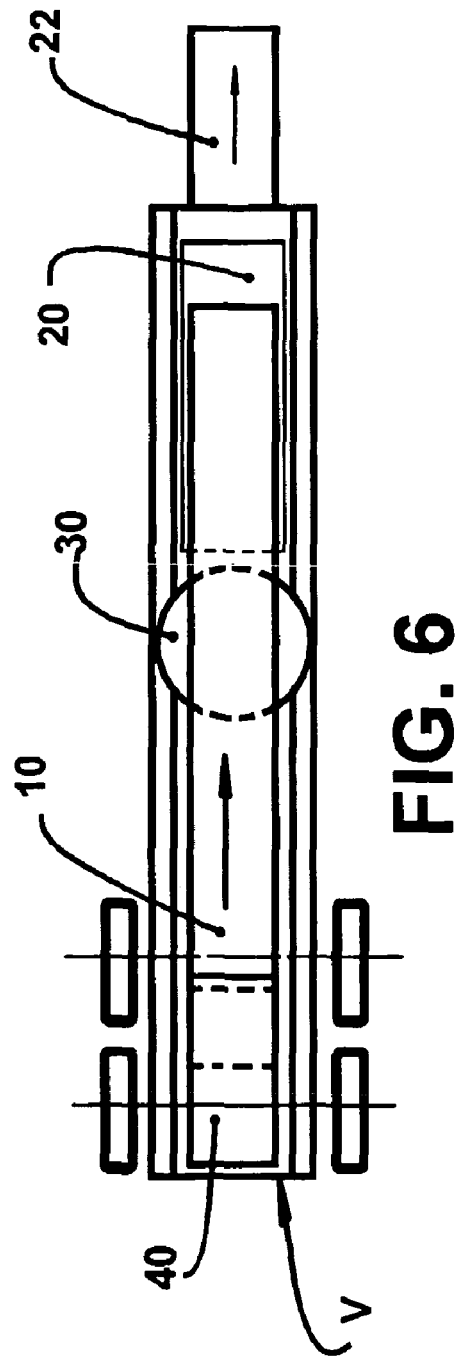
FIG. 5
FIG. 6

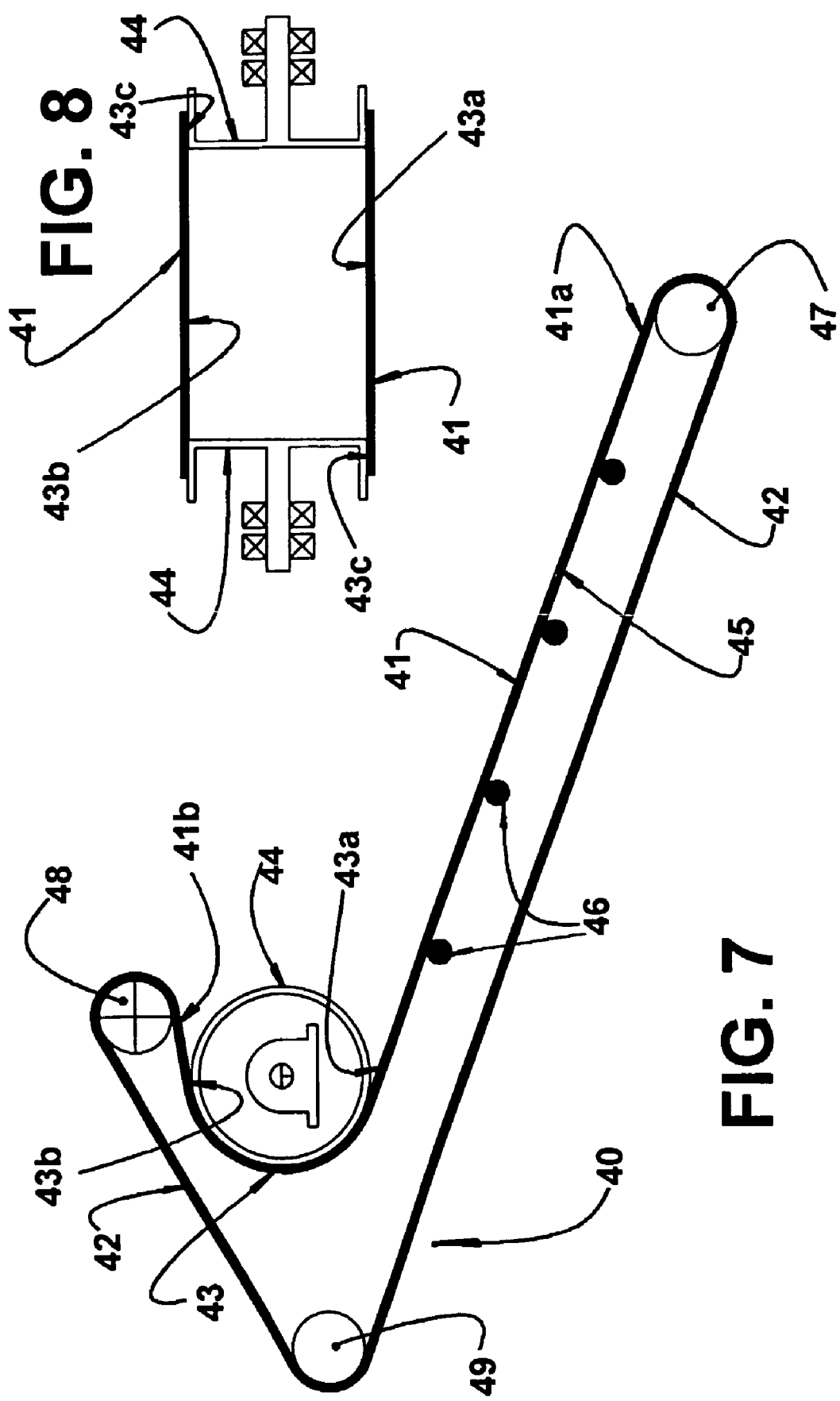

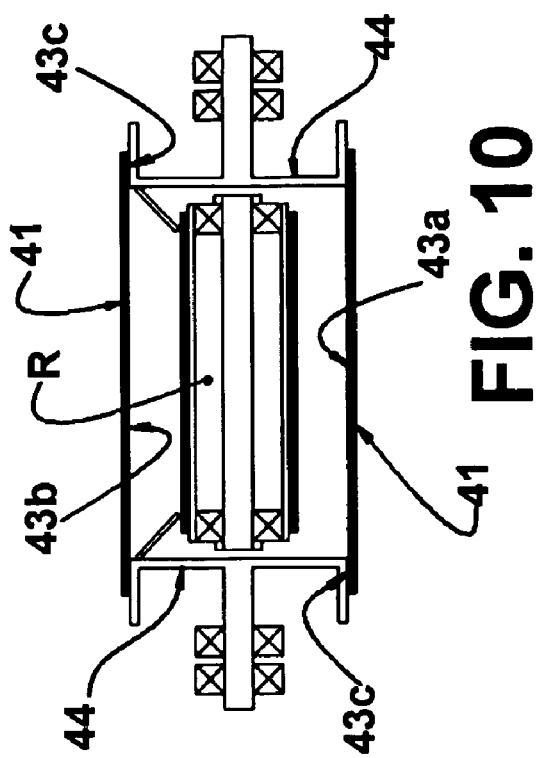
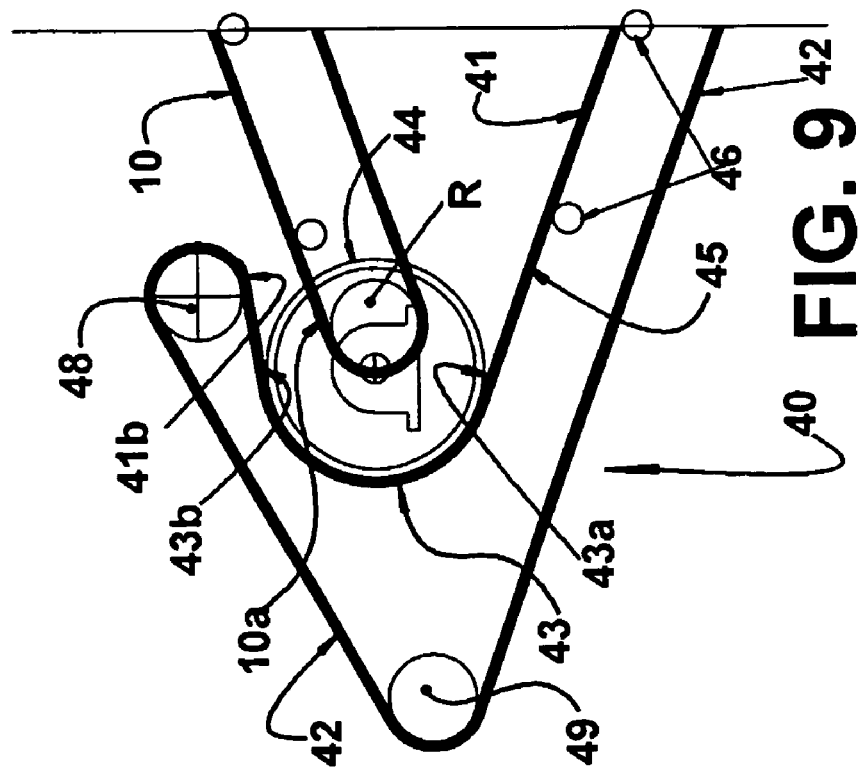

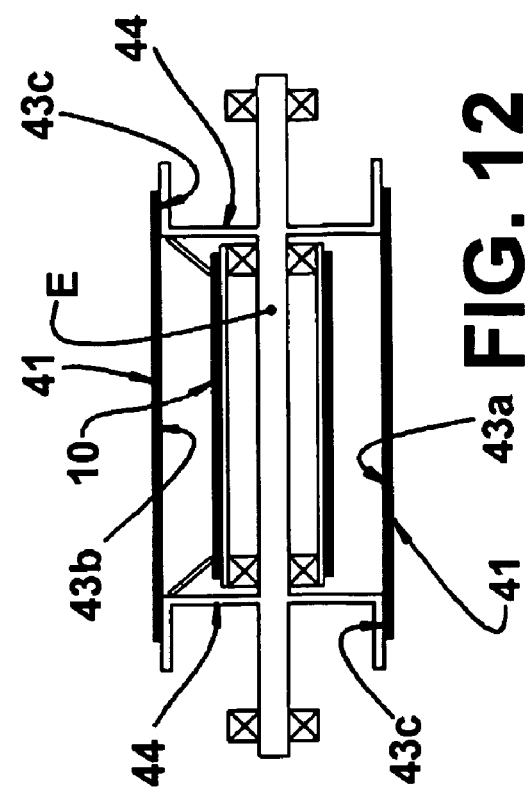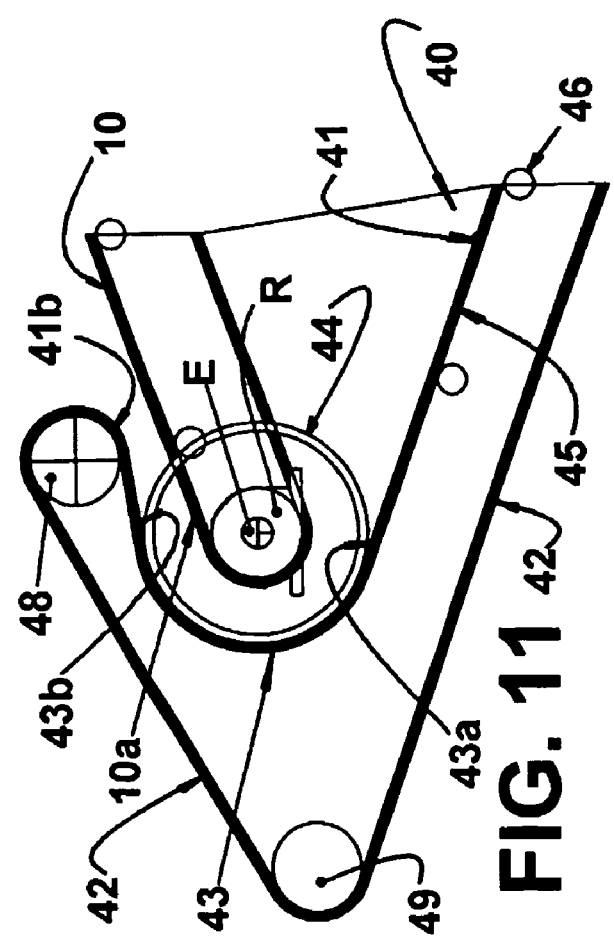

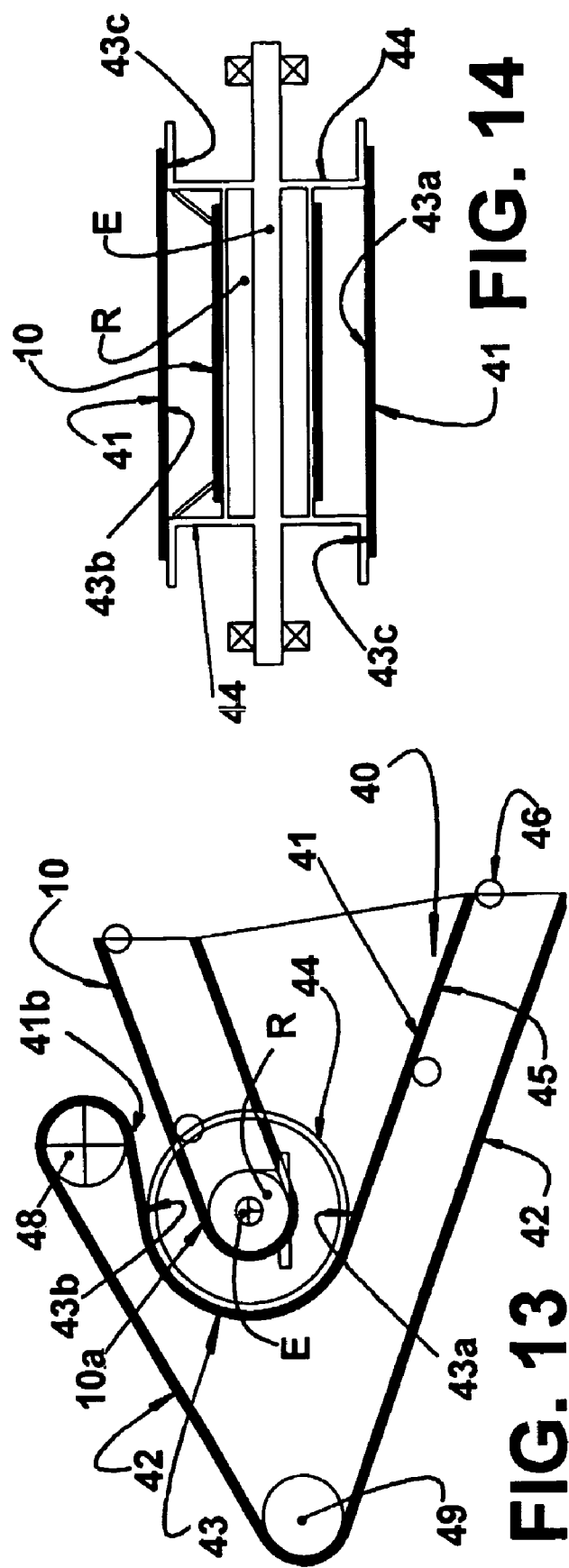

BELT CONVEYOR AND CRUSHING UNIT

CROSS-REFERENCE TO RELATED APPLICATIONS

This application is a 371 of PCT/BR03/00054, filed on Apr. 1, 2003.

BACKGROUND OF THE INVENTION

1. Field of the Invention

The present invention refers to an endless belt conveyor for vegetable or mineral bulk products, and more particularly to an endless belt conveyor for the formation of a closed loop in a fixed or movable crushing unit. The invention is further directed to a crushing unit comprising the belt conveyor.

2. Description of the Related Art

Crushing units are well known, particularly those mounted on a vehicle chassis, comprising belt conveyors which are respectively and operatively associated with a crusher and with a classifying screen, for allowing the material, which is rejected by the classifying screen and passed through the crusher, to be reconducted to the screen, in order to be submitted to a new classification. This system of returning the crushed material to the classifying screen is generally denominated closed crushing loop and is schematically illustrated in FIGS. 1 and 2 of the enclosed drawings.

In the movable crushing units mounted on a vehicle chassis V, the bulk material to be crushed is directly or indirectly fed to a first belt conveyor 10 which conducts the material to a classifying screen 20, for example a vibrating screen, in which it is separated. The material passing through the classifying screen 20 is collected, for example in a hopper 21 and conducted to a discharge conveyor 22, which conducts the material passing through the classifying screen 20 to a storage heap S or any other adequate collecting means.

The large material rejected by the classifying screen 20 is conducted to a crusher 30, so as to be reduced to the desired size of the crushed product. The material released from the crusher 30 is fed to a second return belt conveyor 40 arranged beside the first belt conveyor 10, but which conducts the crushed material upwardly and in an opposite direction to the conduction direction of the first belt conveyor 10, so that it may release the crushed material at a height sufficient to allow the transfer of the material, by means of an inclined chute 50, to the first belt conveyor 10, which conducts the material back to the classifying screen 20, completing the closed crushing loop. It should be noted that the feeding of bulk material to the crushing unit can be made in the first belt conveyor 10, for example in the region where the crushed material is received, or in the second belt conveyor 40.

In these crushing units, the length of the second belt conveyor should be dimensioned to position its discharge end at a height much higher than that of the feed end of the first belt conveyor 10, in order to allow the transfer of the crushed material coming from the crusher 30 and to be returned to the classifying screen 20. In the illustrated construction, in which the first and the second belt conveyors 10 and 40 are arranged side-by-side, the transfer is carried out through the inclined chute 50.

The above-described closed loop has the function to reduce all the material sent to the crushing unit to a size that is smaller than the mesh of the classifying screen 20. This arrangement is applied to both the movable units and to the fixed units and it is particularized in that the return of the material to the classifying screen 20 is accomplished by means of two belt conveyors disposed side by side and moved in opposite directions.

One of the disadvantages of this solution refers to the height that the discharge end of the second belt conveyor 40 should present and which should be much higher than the height of the feed end of the first belt conveyor 10.

In order to avoid the material being carried by the second belt conveyor 40 from sliding in a direction opposite to that of the conveying run, the slope angle of the second belt conveyor 40 must be limited, usually not higher than 20 degrees.

The closed loop, as described above, requires a very long second belt conveyor 40, which besides increasing the cost in the case of movable units on wheels, impairs the displacement of these crushing units on highways.

The first and the second belt conveyors 10 and 40 on being arranged side by side increase the width of the crushing unit, exceeding the limit dimensions for highway transportation, requiring either the partial disassembly of the unit, or special authorizations to travel on highways.

BRIEF SUMMARY OF THE INVENTION

Considering that the limitations imposed to the slope angle of the belt conveyors often lead to the difficulty in providing these conveyors in installations to be constructed in reduced spaces, it is an object of the present invention to provide a belt conveyor for bulk material, which allows in a determined longitudinal conveying extension, to lift the bulk material being carried at a height that has not been attained before with the known prior art belt conveyors.

It is a further more specific object of the present invention to provide a belt conveyor such as defined above, which presents a discharge end that is sufficiently lifted to discharge the bulk material in another belt conveyor, which is at least partially aligned above the first conveyor and which is driven in an opposite direction to the direction of the first conveyor, in order to avoid the side by side arrangement of the conveyors to provide the return of the bulk material to a processing equipment through which it has already passed.

It is a further object of the present invention to provide a crushing unit, particularly a crushing unit on a vehicle chassis, comprising the belt conveyor mentioned above and a conventional belt conveyor operatively associated thereto, in order to define a closed crushing loop having substantially reduced longitudinal extension and width, and according to which the bulk material is returned to a classifying screen after passing through a crusher fed with the material rejected by the classifying screen.

These objects are attained through a belt conveyor comprising a conveying upper run presenting a feed end disposed vertically spaced from and above a discharge end, and a return lower run. The conveying upper run comprises a curved extension, which is concave and ascending and presents an inlet lower portion and an outlet upper portion, the latter ending at the discharge end of the conveying upper run, where the belt conveyor imparts to the material a path that is substantially coplanar and opposite in relation to that imparted to the material in the inlet lower portion, the curved extension presenting a curvature so as to produce, on the material conveyed at a determined belt speed, a centrifugal force sufficient to maintain the material seated against the ascending curved extension of the conveying upper run, until reaching the discharge end.

The belt conveyor defined above may be utilized, for example to form the closed loop of a crushing unit in which the conveyor receives the material from a crusher, conducting the material at a height sufficient to transfer it to another belt conveyor vertically disposed above the first one and conducting the crushed material to a classifying screen.

BRIEF DESCRIPTION OF THE SEVERAL VIEWS OF THE DRAWINGS

The invention will be described below, with reference to the enclosed drawings, in which:

FIG. 3 is a schematic lateral view of a belt conveyor constructed according to the present invention;

FIG. 4 is a schematic sectional view taken according to the line IV-IV of FIG. 3, illustrating a detail of the construction of the curved extension of the belt conveyor of the present invention;

FIG. 5 is a schematic lateral view of a movable crushing unit, using a belt conveyor constructed in accordance to the present invention;

FIG. 6 is a schematic top view of the crushing unit illustrated in FIG. 5;

FIG. 7 is a schematic lateral view of a belt conveyor constructed in accordance to a first constructive alternative for carrying out the present invention;

FIG. 8 is a schematic front view of the belt conveyor illustrated in FIG. 7;

FIG. 9 is a schematic lateral view of a belt conveyor constructed according to a second constructive alternative for carrying out the present invention;

FIG. 10 is a schematic front view of the belt conveyor illustrated in FIG. 9;

FIG. 11 is a schematic lateral view of a belt conveyor constructed according to a third constructive alternative for carrying out the present invention;

FIG. 12 is a schematic front view of the belt conveyor illustrated in FIG. 11;

FIG. 13 is a schematic lateral view of a belt conveyor constructed according to a fourth constructive alternative for carrying out the present invention; and FIG. 14 is a schematic front view of the belt conveyor illustrated in FIG. 13.

DETAILED DESCRIPTION OF THE INVENTION

Figure 1:
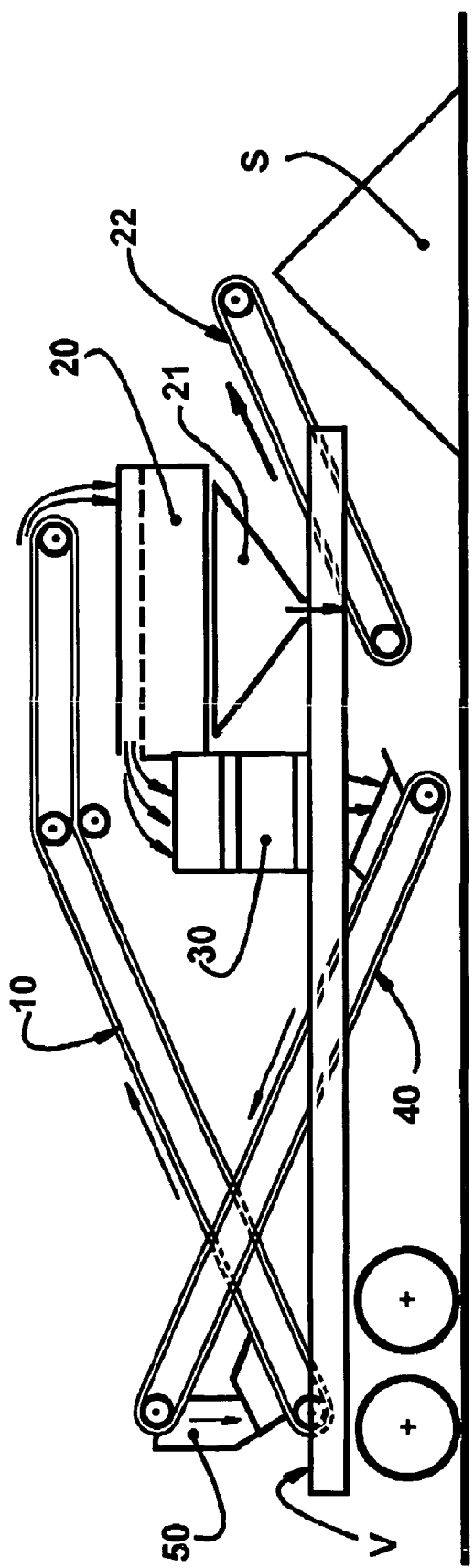
FIG. 1 is a schematic lateral view of a movable crushing unit, presenting the belt conveyors constructed in accordance to the prior art.
Figure 2:
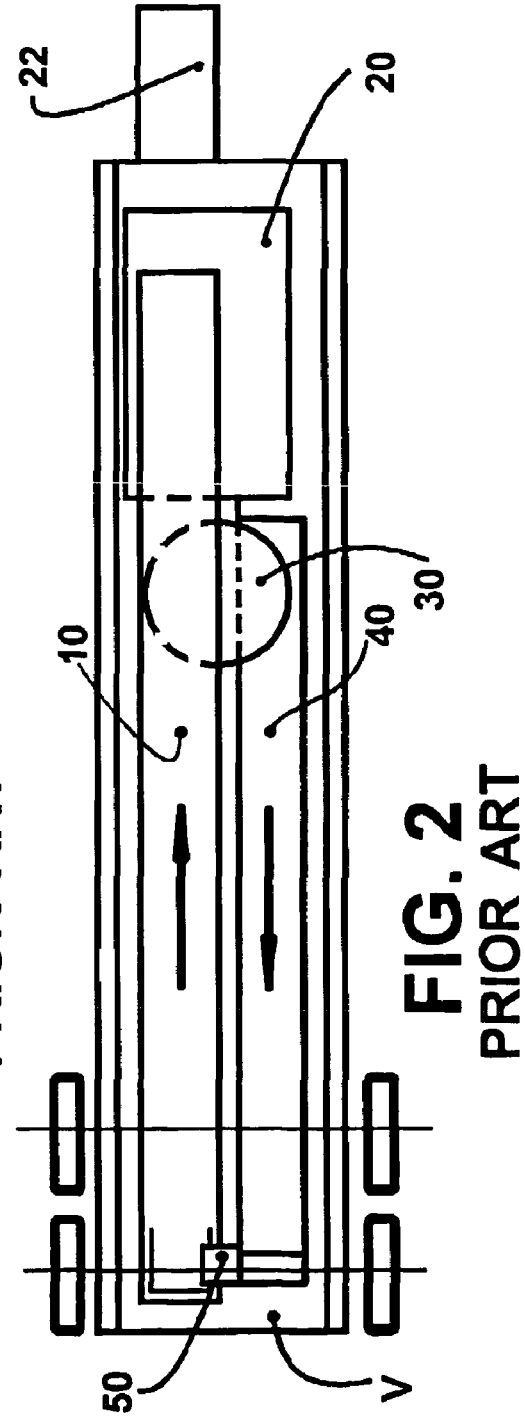
FIG. 2 is a schematic top view of the crushing unit illustrated in FIG. 1.

As already described in relation to the known construction of the movable crushing unit illustrated in FIGS. 1-2, in order to make the crushed material return to the classifying screen 20 after it has passed through the crusher 30, two belt conveyors 10, 40 have been used arranged side-by-side, one of them being the second belt conveyor 40 responsible for conducting the material received from the crusher 30, until reaching a height which is sufficient to transfer, by means of the inclined chute 50, the material to the first belt conveyor 10 which conducts the crushed material back to the classifying screen 20.

In the installations where there is no limitation of space, the full width of the two belt conveyors 10, 40 arranged side-by-side is not a problem, the same occurring with the longitudinal extension of the second belt conveyor 40, which must reach a height at its discharge end so as to allow the crushed material to be adequately transferred to a feed end 10a of the first belt conveyor 10, maintaining an inclination within the acceptable limits for the correct upward conveyance of the material.

However, in determined cases, as it occurs with the movable crushing units on wheels, the problem of the dimensions in terms of width and longitudinal extension of the crushing unit is of great importance, which makes desirable to obtain the lift of the crushed material and its return to the classifying screen 20 on a vehicle chassis V with acceptable length and width to circulate on a highway and at an acceptable or compatible cost in relation to the usual solutions.

Considering the specific application exemplified in the drawings, the second belt conveyor 40 comprises a conveying upper run 41 and a return lower run 42. The conveying upper run 41 presents a feed end 41a disposed so as to receive the bulk material to be conveyed, and a discharge end 41b disposed at a height above the feed end 41a, so as to allow the bulk material to be transferred to another belt conveyor or another bulk material processing equipment. In the present exemplary construction, the other conveyor is the first belt conveyor 10, which is responsible for conducting the material to the classifying screen 20, whereas the feed end 41a of the conveying upper run 41 receives the material from the crusher 30. It should be understood that the second belt conveyor 40 could be assembled in different installations, in which an intense lift of the bulk product in relation to the longitudinal extension available to the lift is desired.

According to the invention, the conveying upper run 41 comprises a curved extension 43, which is concave and ascending and presents an inlet portion 43a and an outlet portion 43b, the latter ending at the discharge end 41b of the conveying upper run 41, where the second belt conveyor imparts to the material a path that is substantially coplanar and opposite in relation to that imparted to the material in the inlet portion 43a.

In order that this material M to be conveyed remains seated on the material support face of the conveying upper run 41 throughout the whole curved extension 43 in which the material has its path progressively altered upwardly and backwardly, until it presents an opposite direction to that of the inlet in the curved extension 43, the second belt conveyor 40 is driven at a determined velocity to produce, in the curved extension, a centrifugal force which is sufficient to maintain the material M in the second belt conveyor 40 until reaching the discharge end 41b, when the material M is allowed to fall onto any collecting means. Thus, the radius of curvature of the curved extension 43 is dimensioned as a function of the conveying height to be achieved, and also of the speed allowed for the second belt conveyor 40.

The radius of curvature of the curved extension 43 can be constant or it can vary decreasingly upwardly, so as to allow a higher centrifugal force in the upper region of the curved extension 43 to be achieved, from a given displacement velocity of the second belt conveyor 40.

In order to allow the conveying upper run 41 to present the curved extension 43 concave and ascending, the latter has its material support face marginally seated on support rollers 44 that are arranged to maintain the desired curvature for the curved extension 43, preventing the conveying upper run 41 from collapsing to the inside of the contour of the curved extension 43.

According to the present invention, the sustaining face of the curved extension 43 presents a pair of opposite marginal portions 43c, each being seated on at least one support roller 44, as illustrated in FIGS. 7-14, or also on a plurality of support rollers 44, such as illustrated in FIGS. 3-5.

As illustrated in FIG. 3, the conveying upper run 41 of the second belt conveyor 40 may further comprise a linear extension 45 arranged immediately downstream of the feed end 41a and ending in the inlet portion 43a of the curved extension 43, with which it matches. This linear extension 45 is conventionally supported by rollers 46 which are disposed so as to impart to this linear extension 45 a slope that is at maximum equal to a limit slope value of a belt conveyor.

The conveying upper run 41 has its ends seated on respective end rolls 47 and 48, between which is defined the return lower run 42 medianly arranged around at least one compensating roll 49.

With the above-mentioned construction, it is possible to provide a belt conveyor that is capable, in a given longitudinal extension of its travel, to lift the material M being transported at a height much higher than the one that would be attained with the conventional constructions of linear belt conveyors.

In the exemplary construction illustrated in FIGS. 5-6 and directed to the crushing unit of the closed loop type illustrated in FIGS. 1-2, the second belt conveyor 40 is constructed with its conveying upper run 41 presenting a linear extension 45 followed by a curved extension 43 in which the material M is intensely lifted and backwardly conducted in a direction that is opposite to the conveying direction in the linear extension 45 and in the inlet portion 43a of the curved extension 43.

The height of the gap existing between the inlet portion 43a and the outlet portion 43b of the curved extension 43 is sufficient for the discharge end 41b of the conveying upper run 41 to transfer the material M to the feed end 10a of the first belt conveyor 10, which is herein vertically disposed above the second belt conveyor 40 and generally in a substantially parallel and vertically aligned mode in relation to the conveying upper run 41 of the second belt conveyor 40, as illustrated in FIGS. 5-6. In this case, the feed end 10a of the first belt conveyor 10 is positioned within the curved extension 43, below the discharge end 41a of the conveying upper run 41 of the second belt conveyor 40.

The constructions of the present invention thus allow achieving, not only a substantial reduction in the longitudinal extension of the crushing unit, but also a considerable width reduction, due to the fact that the two belt conveyors are disposed one over the other and no more side by side, whereby it is also possible to suppress the inclined chute 50 for transferring the material from the second to the first belt conveyor 10.

As already mentioned, the new belt conveyor 40 can be entirely formed by a curved extension 43 with a single radius or with different radii of curvature, which can be progressively reduced to increase the centrifugal force on the material M, as the angle of inclination increases, until the total inversion of the conveying direction in the discharge end 41b has been achieved.

In the embodiments illustrated in FIGS. 7-14, the curved extension 43 has its material support face in each marginal portion 43c seated on a support roller 44, whose radius of curvature defines the radius of curvature of the curved extension 43, each of the support rollers 44 which define the radius of curvature of the curved extension 43 being mounted to a respective shaft externally journalled to the adjacent side of the second belt conveyor 40.

In a constructive variation illustrated in FIGS. 9-10, the first belt conveyor 10 has its feed end 10a mounted around a roll R, which is disposed internally and eccentrically to the support rollers 44.

In this constructive option, each of the support rollers 44 defining the radius of curvature of the curved extension 43 is mounted to the respective shaft externally journalled to the adjacent side of the second belt conveyor 40.

In another constructive variation illustrated in FIGS. 11-14, the first belt conveyor 10 has its feed end 10a mounted around a roll R, which is provided internally and coaxially in relation to the support rollers 44. In the constructive option illustrated in FIGS. 11 and 12, the roll R of the feed end 10a is incorporated, in a single piece, to the two support rollers 44. In the constructive option illustrated in FIGS. 13 and 14, the roll R of the feed end 10a is supported on a common end of the two support rollers 44, internally to the latter.

What is claimed is:

1. A belt conveyor comprising:
    a conveying upper run including: a feed end, a discharge end, and a return lower run (42); characterized in that the conveying upper run comprises a curved extension (43), which is concave and ascending and includes an inlet lower portion (43a) and an outlet upper portion (43b), the latter ending at the discharge end (41b) of the conveying upper run (41);
    wherein the belt conveyor provides to material on the belt conveyor a path that is substantially coplanar and opposite in relation to that imparted to the material in the inlet portion (43a), said ascending curved path providing a curvature for producing a centrifugal force on the material conveyed at a determined belt speed, wherein the centrifugal force is sufficient to maintain the material seated against the curved extension (43) of the conveying upper run (41), until reaching the discharge end (41b), wherein said curved extension (43) has a single radius of curvature and has a material support face having opposite marginal portions (43c), each seated on one respective support roller (44) having a radius of curvature defines the radius of curvature of the curved extension.

2. The belt conveyor according to claim 1, wherein the conveying upper run (41) further includes a linear extension (45) arranged immediately downstream of the feed end (41a) and ending in the inlet portion (43a) of the curved extension (43).

3. The belt conveyor according to claim 2, wherein the linear extension (45) presents an inclination at maximum equal to a limit slope value for a belt conveyor.

4. A crushing unit, comprising:
    a first belt conveyor (10) for conducting a bulk material (M) to a classifying screen (20) for discharging rejected large material;
    a second belt conveyor (40) which includes a second conveying upper run (41) including a second feed end (41a); a lifted discharge end (41b); a return lower run (42); and a curved extension (43), which is concave and ascending for transporting the bulk material and includes an inlet lower portion (43a) and an outlet upper portion (43b) ending at the discharge end (41b) of the second conveying upper run (41);
    a crusher (30) for receiving rejected material from the classifying screen (20) and discharging material to the second feed end (41a) of a conveying upper run (41); and
    wherein the first conveyor belt has a feed end (10a) positioned in the curved extension (43) of the second conveyor (40), the first belt conveyor (10) being vertically disposed above the second belt conveyor (40), the curved extension having a single radius of curvature and having a material support face having opposite marginal portions (43c), each seated on one respective support roller (44) having a radius of curvature which defines the radius of curvature of the curved extension (43), the first conveyor 10 having a feed end (10*a*) mounted around a roll (R) disposed internally and coaxially in relation to said support rollers (44).

5. The crushing unit according to claim 4, wherein the first belt conveyor (10) is parallel and vertically aligned in relation to the second belt conveyor (40).

6. The crushing unit according to claim 4, wherein the first and second belt conveyors are mounted on a vehicle chassis V.

7. The crushing unit according to claim 4, wherein the second conveying upper run (41) further includes:
a linear extension (45) arranged immediately downstream to the feed end (41*a*) and ending in the inlet portion (43*a*) of the curved extension (43).

8. The crushing unit according to claim 7, wherein the linear extension (45) presents an inclination at maximum equal to a limit inclination value for the second belt conveyor.

9. The crushing unit according to claim 4, wherein the first conveyor (10) has the first feed end (10*a*) affixed internally and eccentrically in relation to the support rollers (44).

10. The crushing unit according to claim 4, wherein each of the support rollers (44), which defines the radius of curvature of the curved extension (43), is mounted to a respective shaft that is externally journalled to the adjacent side of the second belt conveyor (40).

11. The crushing unit according to claim 4, wherein the support rollers (44) which define the radius of curvature of the curved extension (43) are mounted to a common single shaft, with the ends external to the respective opposite sides of the second belt conveyor (40) resting on respective bearings.

12. The crushing unit according to claim 4, wherein the roll (R) of the feed end (10*a*) is incorporated in a single piece to the support rollers (44).

13. The crushing unit according to claim 4, wherein the roll (R) of the feed end (10*a*) is supported on the common end of the two support rollers (44), and supported internally to one of the two support rollers (44).

* * * * *